3,300,481
PROCESS FOR THE PREPARATION OF 5-THIENYL-1,3-DIHYDRO-2H-1,4-BENZODIAZEPIN-2-ONE-4-OXIDES
Stanley C. Bell and Scott J. Childress, Philadelphia, Pa., assignors to American Home Products Corporation, New York, N.Y., a corporation of Delaware
No Drawing. Filed Apr. 27, 1964, Ser. No. 362,917
1 Claim. (Cl. 260—239.3)

This case is a continuation-in-part of application Serial No. 233,456, filed October 26, 1962.

This invention relates to 2-substituted-amino-5-(2- and 3-thienyl)-3H-1,4-benzodiazepine 4-oxides and to a process for making them.

The compounds sought to be patented are valuable because of their unusual pharmacological properties. They are central nervous system depressants and are useful as sedatives. They are also of great interest because they can be used as intermediates in the preparation of 1,4-benzodiazepine-2-ones, such as 7-chloro-5-(2-thienyl)-1,3-dihydro-2H-1,4-benzodiazepin-2-one 4-oxide, which are nervous system depressants of proven efficacy. These latter compounds are disclosed and claimed in co-pending application Ser. No. 87,102, filed February 6, 1961.

The compounds sought to be patented have the following general formula:

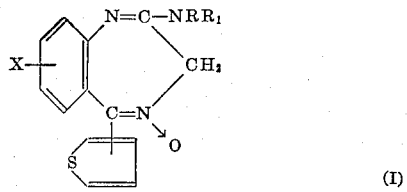

(I)

wherein X is a member of the class consisting of hydrogen, halogen having an atomic weight not in excess of 80, and haloalkyl; R is hydrogen, or lower alkyl; $R_1$ is hydrogen or lower acyl, and the pharmaceutically acceptable, non-toxic strong acid salts thereof.

These compounds are prepared by reacting a 2-halomethyl-4-(2- or 3-thienyl)-quinazoline-3-oxide (II) with an aliphatic primary amine such as methylamine or ammonia to form a 2-alkyl-amino-5-(2- or 3-thienyl)-3H-1,4-benzodiazepine 4-oxide (III) then acylating the latter product to form the corresponding N-alkylacylamido compound (I). Hydrolyzing the latter compound with a dilute mineral acid produces the 1,3-dihydro-5-(2- or 3-thienyl)-2H-1,4-benzodiazepin-2-one 4-oxides (IV).

The above-outlined reactions may be represented schematically as follows:

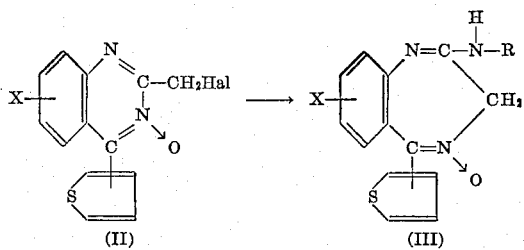

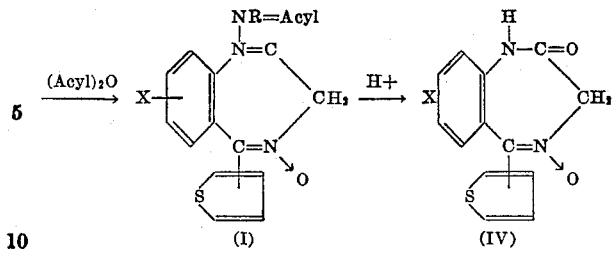

The following examples illustrate the practice of the invention.

Example 1

To a solution of 150 ml. of methanol saturated with methylamine was added with stirring 8.2 g. of 6-chloro-2-chloromethyl-4-(2-thienyl)quinazoline 3-oxide. After refluxing for 20 minutes, the reaction mixture was cooled and the product, 7-chloro-2-methylamino-5-(2-thienyl)-3H-1,4-benzodiazepine 4-oxide, M.P. 267–268° C. was collected. The compound was converted to the hydrochloride salt, M.P. 256–257° C.

Analysis.—Calculated for: $C_{14}H_{13}Cl_2N_3OS$: C, 49.13; H, 3.83; N, 12.28. Found: C, 48.92; H, 3.73; N, 12.37.

Example 2

To a solution of 20 ml. of pyridine and 4 ml. of acetic anhydride was added 1.0 g. of 7-chloro-2-methylamino-5-(2-thienyl)-3H-1,4-benzodiazepine 4-oxide and the reaction mixture heated on the steam bath for 15 minutes. The solution was cooled, diluted with 2 volmes of water and the product, 7-chloro-2-(N-methylacetamido)-5-(2-thienyl)-3H-1,4-benzodiazepine 4-oxide, M.P. 198–200° C. was filtered and washed with alcohol.

Analysis.—Calculated for: $C_{16}H_{17}ClN_3O_2S$: N, 12.08. Found: N, 11.81.

Example 3

A suspension of 0.5 g. of 7-chloro-2-(N-methylacetamido)-5-(2-thienyl)-3H-1,4-benzodiazepine 4-oxide in 5 ml. of alcohol and 2 ml. of 3 N HCl was warmed on the steam bath forming a clear solution. In a few minutes, a solid precipitated out and after cooling the product, 7-chloro-5-(2-thienyl)-1,3-dihydro-2H - 1,4 - benzodiazepin-2-one 4-oxide, M.P. 254–256° C. was collected.

Example 4

By following the procedures of Examples 1 and 2, but using as a starting material 6-trifluoromethyl-2-chloromethyl-4-(2-thienyl)quinazoline 3-oxide, 7-trifluoromethyl-2-(N-methylacetamido)-5-(2-thienyl)-3H - 1,4 - benzodiazepine 4-oxide is prepared.

Example 5

By following the procedures of Examples 1 and 2, but using as a starting material 6-chloro-2-chloromethyl-4-(3-thienyl)quinazoline 3-oxide, prepared as described for the 2-thienyl compound in the co-pending application above referred to, and ammonia, 7-chloro-2-acetamido-5-(3-thienyl)-3H-1,4-benzodiazepine 4-oxide is prepared.

Example 6

By following essentially the procedures of Examples 1 and 2, but starting from 6-trifluoromethyl-2-chloromethyl- 4-(3-thienyl)quinazoline 3-oxide, 7-trifluoromethyl-2-(N-methylacetamido)-5-(3-thienyl)-3H-1,4-benzodiazepine 4-oxide is prepared.

*Example 7*

By following essentially the procedures of Examples 1 and 2, but starting from 2-chloromethyl-4-(2-thienyl) quinazoline 3 - oxide, 2-(N-methylacetamido)-5-(2-thienyl)-3H-1,4-benzodiazepine 4-oxide is prepared.

What is claimed is:

The process which comprises treating with a member of the group consisting of ammonia and primary aliphatic amines a compound selected from the group consisting of 2-halomethyl-4-(2-thienyl)quinazoline 3-oxide and 2-halomethyl-4-(3-thienyl)quinazoline 3-oxide to form the corresponding 2-methylamino-3H-1,4-benzodiazepine 4-oxide compound, acylating said compound with an acyl anhydride to form the corresponding 2-alkylacylamino compound, and treating said latter compound with acid to form the corresponding 1,3-dihydro-2H-2-one compound.

No references cited.

WALTER A. MODANCE, *Primary Examiner.*

ROBERT T. BOND, *Assistant Examiner.*